(12) United States Patent
Hussein et al.

(10) Patent No.: US 8,375,338 B1
(45) Date of Patent: Feb. 12, 2013

(54) ESTIMATING THE RATE OF STORAGE CORRUPTION FROM ATOMIC PARTICLES

(75) Inventors: Jameel Hussein, Sunnyvale, CA (US); Austin H. Lesea, Los Gatos, CA (US); Kenneth D. Chapman, Woking (GB); Ching Y. Hu, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 189 days.

(21) Appl. No.: 12/975,102

(22) Filed: Dec. 21, 2010

(51) Int. Cl.
*G06F 17/50* (2006.01)

(52) U.S. Cl. ........................................................ 716/101

(58) Field of Classification Search .................. 716/100, 716/101
See application file for complete search history.

(56) References Cited

U.S. PATENT DOCUMENTS

| | | | |
|---|---|---|---|
| 6,532,750 B1 * | 3/2003 | Hood | 62/48.3 |
| 6,578,178 B2 * | 6/2003 | Mau | 716/115 |
| 6,848,063 B2 * | 1/2005 | Rodeheffer et al. | 714/6.2 |
| 7,249,010 B1 | 7/2007 | Sundararajan et al. | |
| 7,380,197 B1 * | 5/2008 | Goolsby | 714/758 |
| 7,406,673 B1 | 7/2008 | Patterson et al. | |
| 7,979,835 B1 | 7/2011 | Schumacher et al. | |
| 2003/0066036 A1 * | 4/2003 | Mau | 716/2 |
| 2003/0097608 A1 * | 5/2003 | Rodeheffer et al. | 714/7 |
| 2007/0050695 A1 * | 3/2007 | Schulz | 714/752 |
| 2010/0005230 A1 * | 1/2010 | Ho | 711/103 |
| 2010/0223755 A1 * | 9/2010 | Wuu et al. | 714/755 |
| 2011/0208933 A1 * | 8/2011 | Selfin et al. | 711/162 |
| 2011/0291169 A1 * | 12/2011 | Ervin et al. | 257/300 |

OTHER PUBLICATIONS

Chapman, Ken, *SEU Strategies for Virtex-5 Devices*, XAPP864 (v2.0), Apr. 1, 2010, pp. 1-16, Xilinx, Inc., San Jose, California, USA.
Hu, Ching et al., *NSEU Mitigation in Avionics Applications*, XAPP1073 (v1.0), May 17, 2010, pp. 1-12, Xilinx, Inc., San Jose, California, USA.
JEDEC Solid State Technology Association, Measurement and Reporting of Alpha Particle and Terrestrial Cosmic Ray-Induced Soft Errors in Semiconductor Devices, *JEDEC Standard JESD89A*, Oct. 2006, pp. 1-94, especially equations A-3, A-4, A-5, A-6 and A-7, and table A.3-C in Annex A, JEDEC Solid State Technology Association, Arlington, Virginia, USA.
Xilinx, Inc., *Device Reliability Report*, UG116 (v5.11), Nov. 1, 2010, pp. 1-110, especially Table 1-15, "Real Time Soft Error Rates," Xilinx, Inc., San Jose, California, USA.
U.S. Appl. No. 12/041,167, filed Mar. 3, 2008, Schumacher et al.
U.S. Appl. No. 12/398,270, filed Mar. 5, 2009, Schumacher et al.
U.S. Appl. No. 13/217,496, filed Aug. 25, 2011, Paul R. Schumacher et al.
Asadi, Ghazanfar et al., "Soft Error Rate Estimation and Mitigation for SRAM-Based FPGAs," *Proc. of the 13th ACM/SIGDA International Symposium on Field Programmable Gate Arrays*, Feb. 20, 2005, pp. 1-12, ACM, New York, New York, USA.

(Continued)

*Primary Examiner* — Suchin Parihar
(74) *Attorney, Agent, or Firm* — LeRoy D. Maunu (57) ABSTRACT

Methods and systems estimate a rate of corruption of storage bits in a logic circuit. One or more processors execute instructions that cause the processors to perform the operations that follow. A description is input describing an environment of the logic circuit, and the description of the environment includes a position of the logic circuit. An atomic particle flux density at the logic circuit is estimated as a function of the description of the environment. A specification is input that specifies the storage bits in the logic circuit. The rate of corruption of the storage bits is determined as a function of the atomic particle flux density and a quantification of the storage bits in the logic circuit.

20 Claims, 5 Drawing Sheets

OTHER PUBLICATIONS

Chen, Deming et al., "High-Level Power Estimation and Low-Power Design Space Exploration for FPGAs," The 44th Design Automation Conference (DAC'07), Jun. 4-8, 2007, pp. 529-534, San Diego, California.

Duan, Lide et al., "Versatile Prediction and Fast Estimation of Architectural Vulnerability Factor from Processor Performance Metrics," *Proc. of the 2009 IEEE 15th International Symposium on High Performance Computer Architecture*, Feb. 14, 2009, pp. 129-140, IEEE, Piscataway, New Jersey, USA.

Li, Xiaodong et al., "Online Estimation of Architectural Vulnerability Factor for Soft Errors " *Proc. of the 35th Annual International Symposium on Computer Architecture*, Jun. 21, 2008, pp. 1-12, IEEE Computer Society, Washington, DC, USA.

Mukherjee, Shubhendu S. et al., "A Systematic Methodology to Compute the Architectural Vulnerability Factors for a High-Performance Microprocesor " *Proc. of the IEEE/ACM 36th Annual International Symposium on Microarchitecture*, Dec. 3, 2003, pp. 29-40, IEEE, Piscataway, New Jersey, USA.

Sundararajan, Prasanna, "Estimation of Single Event Upset Probability Impact of FPGA Designs," *Proc. of the 6th Annual International Conference on Military and Aerospace Programmable Logic Devices*, Sep. 9, 2003, pp. 1-4.

\* cited by examiner

FIG. 5

ESTIMATING THE RATE OF STORAGE CORRUPTION FROM ATOMIC PARTICLES

FIELD OF THE INVENTION

One or more embodiments generally relate to soft errors in integrated circuits, and more particularly to estimating a rate of single event upsets.

BACKGROUND

Cosmic radiation includes high-energy atomic particles. When cosmic radiation strikes an integrated circuit, the high-energy atomic particles can create a string of hole and electron pairs in a substrate of the integrated circuit. A circuit node of the integrated circuit can collect the holes or the electrons. If a storage node collects enough charge from the holes or electrons, the value stored by the storage node can become corrupted. This corruption of a storage node is denoted a soft error because the integrated circuit again operates properly after a reset and/or correction of the corrupted value.

Various techniques permit detection and mitigation of soft errors. However, these techniques are difficult and time consuming to implement, and these techniques are often especially difficult and time consuming to implement without seriously impacting system functionality.

SUMMARY

In one embodiment, a method estimates a rate of corruption of storage bits in a logic circuit. One or more processors execute instructions that cause the processors to perform the operations that follow. A description is input describing a planned environment for the logic circuit, and the description of the environment includes a position of the logic circuit. An atomic particle flux density at the logic circuit is estimated as a function of the description of the environment. A specification is input that specifies the storage bits in the logic circuit. The rate of corruption of the storage bits is determined as a function of the atomic particle flux density and a quantification of the storage bits in the logic circuit. The rate is displayed.

In another embodiment, a system estimates a rate of corruption of storage bits in a logic circuit. The system includes a non-transitory storage medium and one or more processors. The processors are coupled to the non-transitory storage medium and are configured to execute instructions from the non-transitory storage medium. The non-transitory storage medium stores the instructions that specify operations, and execution of the instructions causes the processors to input a description that describes the planned environment of the logic circuit. The description of the environment includes a position of the logic circuit. An atomic particle flux density at the logic circuit is estimated as a function of the description of the environment. A specification is input that specifies the storage bits in the logic circuit. The rate of corruption of the storage bits is determined as a function of the atomic particle flux density and a quantification of the storage bits in the logic circuit.

It will be appreciated that various other embodiments are set forth in the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Because soft errors are usually rare in a particular system, the system might provide adequate reliability without any detection and mitigation of soft errors. In such a system, the cost of implementing detection and mitigation of soft errors is wasted. The various techniques for detecting and mitigation soft errors generally provide increasing reliability at increasing costs. For a system needing detection and mitigation to achieve a specified reliability, the system should implement the detection and mitigation techniques that achieve the specified reliability, without implementing any costly mitigation techniques that would provide reliability exceeding the specified reliability.

However, the techniques for detecting and mitigating soft errors are generally selected during system design, and the actual rate of soft errors and the actual reliability cannot be measured until the system is implemented and tested. Because of this uncertainty in the actual rate of soft errors, the techniques selected during system design may provide inadequate reliability, or may provide superfluous reliability at extra cost.

To prevent selecting inadequate or superfluous techniques for detecting and mitigating soft errors, an accurate prediction of the soft error rate is needed during system design. The prediction of soft error rate should consider many factors, such as the operating environment of the system, the quantity of storage nodes in the system, and the sensitivity of these storage nodes to corruption by cosmic radiation. Furthermore, the prediction of the soft error rate should document the calculation of the soft error rate, including the factors considered and the assumptions made. Similar documentation should track system reliability and system availability calculated from the predicted soft error rate.

Figure 1:
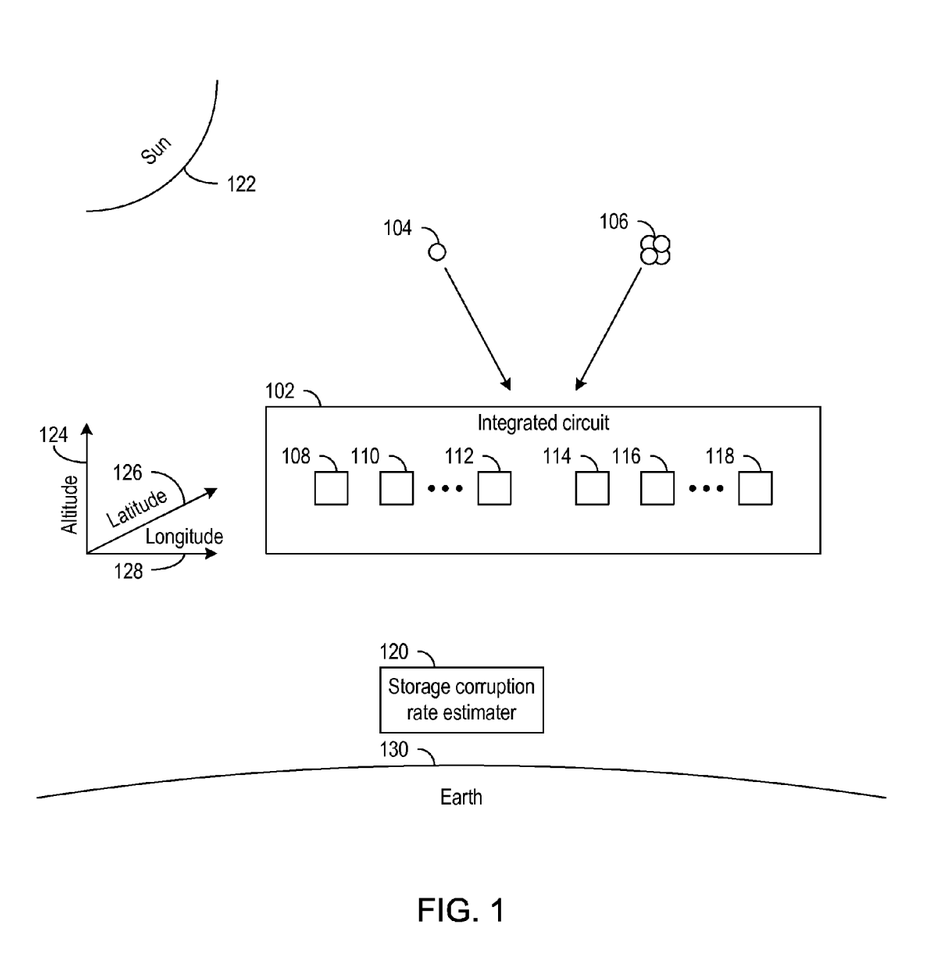
FIG. 1 is a diagram of an environment of integrated circuit.

FIG. 1 is a diagram of an environment of integrated circuit 102. The atomic particles in cosmic radiation include neutrons and alpha particles. A neutron 104 or an alpha particle 106 may corrupt a storage bit in memory cells 108 and 110 through 112, or in block memories 114 and 116 through 118. When an atomic particle causes corruption, usually the atomic particle corrupts only one storage bit. Estimator 120 estimates the rate of cosmic radiation corrupting the storage bits in memory cells 108 and 110 through 112, and in block memories 114 and 116 through 118.

Cosmic radiation includes radiation from outside the solar system and radiation from the sun 122. The cosmic radiation from the sun 122 varies with the current level of solar activity. Thus, the level of solar activity of the sun is important to describe the environment of integrated circuit 102.

Cosmic radiation includes primary particles from outside the atmosphere of the Earth 130 and secondary particles created from cosmic radiation striking atoms in the Earth's atmosphere. Because collisions in Earth's atmosphere attenuate cosmic radiation, the flux density of cosmic radiation increases dramatically with increasing altitude 124. Thus, the altitude 124 of integrated circuit 102 is important to describe the environment of integrated circuit 102.

Cosmic radiation tends to concentrate along the field lines of the Earth's magnetic field. Because of this, cosmic radiation increases with proximity to the poles of the Earth's magnetic field. Because these poles are at high latitudes, the flux density of cosmic radiation has a strong dependence on latitude 126, and because the poles of the Earth's magnetic field tilt relative to the geographic north and south poles, the flux density of cosmic radiation has some dependence on longitude 128. Thus, latitude 126 and longitude 128 are important to describe the environment of integrated circuit 102.

In one embodiment, the estimator 120 inputs a description of the environment of the integrated circuit 102, including inputting a value of the altitude 124, a value of the latitude 126, and a value of the longitude 128 that specify the planned position of the integrated circuit 102. The estimator 120 also inputs the level of solar activity to describe the environment of the integrated circuit 102. The estimator 120 estimates a flux density of the atomic particles as a function of the altitude value, the latitude value, the longitude value, and the level of solar activity. The estimator 120 determines the rate of the cosmic radiation corrupting the storage bits in memory cells 108 and 110 through 112, and/or in block memories 114 and 116 through 118 by multiplying the flux density of the atomic particles, a quantification of the storage bits in integrated circuit 102, and a reference corruption rate.

It will be appreciated that estimator 120 is a predictive tool. As such, estimator 120 inputs either actual or prospective altitude 124, latitude 126, longitude 128, and level of solar activity. For example, a designer may check the predicted rate of corruption of storage bits in an integrated circuit 102 being designed for an aircraft that might fly at high altitude and high latitude during a future period of high solar activity.

Figure 2:
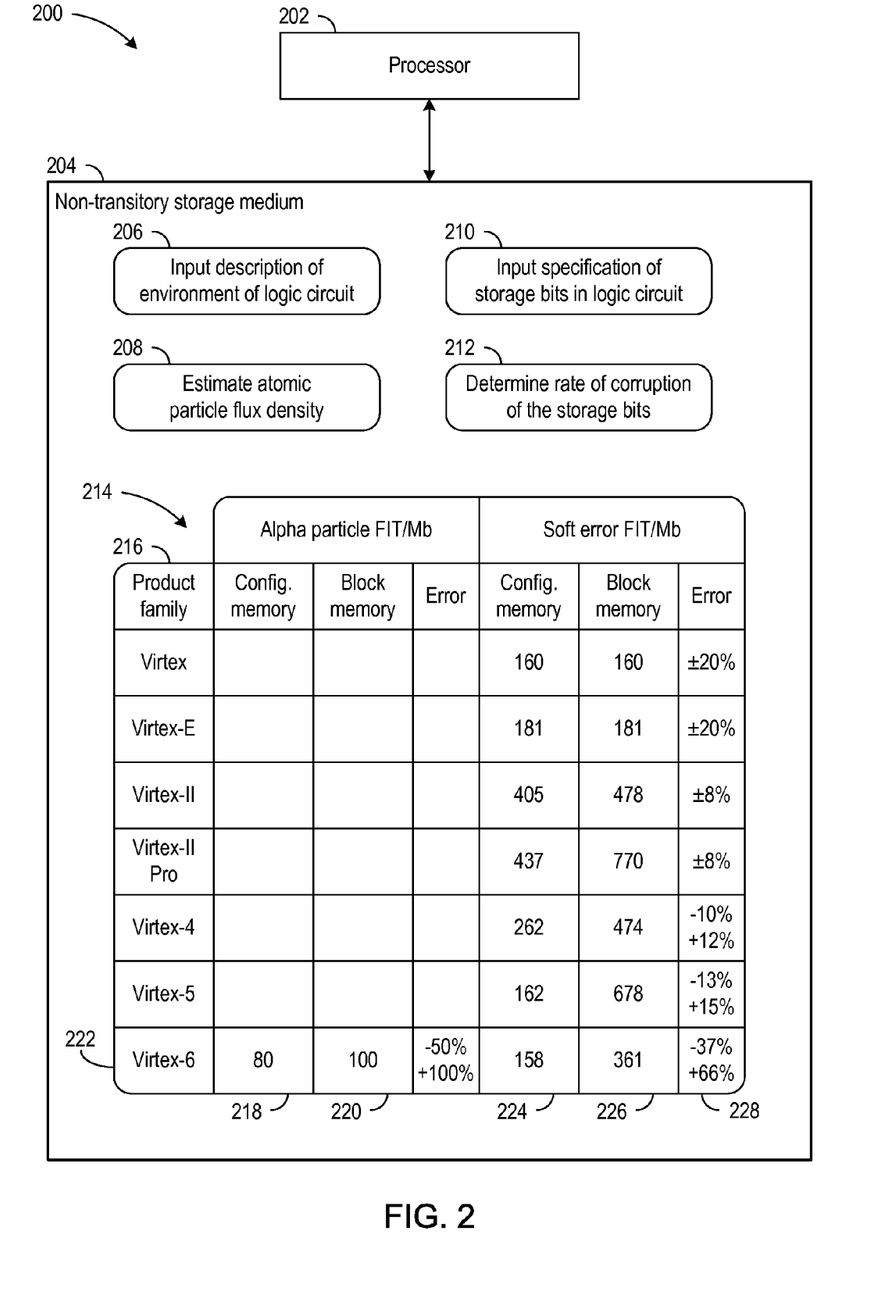
FIG. 2 is a diagram of a system for estimating a rate of corruption of storage bits in a logic circuit.

FIG. 2 is a diagram of a system 200 for estimating a rate of corruption of storage bits in a logic circuit. The system 200 includes a processor 202 coupled to a non-transitory storage medium 204.

The non-transitory storage medium 204 stores modules 206, 208, 210, and 212, and the processor 202 is configured to execute the instructions from the modules 206, 208, 210, and 212 of the non-transitory storage medium 204. Execution of the instructions of modules 206, 208, 210, and 212 causes the processor 202 to perform operations associated with each of the modules.

Execution of the instructions of module 206 causes processor 202 to input a description of an environment of the logic circuit. Execution of the instructions of module 208 causes processor 202 to estimate an atomic particle flux density at the logic circuit as a function of the environment. Execution of the instructions of module 210 causes processor 202 to input a specification of the storage bits in the logic circuit. Execution of the instructions of module 212 causes processor 202 to determine the rate of the atomic particle flux density corrupting the storage bits as a function of the atomic particle flux density and a quantification of the storage bits in the logic circuit.

In one embodiment, the non-transitory storage medium 204 also stores a table 214 of reference corruption rates. For the product families listed in column 216, table 214 shows reference corruption rates of programmable integrated circuits available from Xilinx, Inc. Table 214 is adapted from Table 1-15, "Real Time Soft Error Rates," of version v5.11 of User Guide 116, "Device Reliability Report," available from Xilinx, Inc. Xilinx, Inc. has updated User Guide 116 quarterly to reflect new data from continuing measurements of corruption of the storage bits in the logic devices of the product families of column 216. Because the logic devices in each product family implement configuration memory cells and block memories similarly, each reference corruption rate for configuration memory cells and each reference corruption rate for block memories are essentially the same per storage bit of each logic device in a particular product family. However, the number of configuration memory cells and block memories varies between the logic devices in a particular product family. Because configuration memory cells and block memories are implemented differently in some product families, the reference corruption rates for configuration memory cells and the reference corruption rates for block memories can differ within a particular product family.

The table entries at columns 218 and 220 and row 222 provide reference corruption rates for the "Virtex-6" product family. The table entry at column 218, row 222 provides a reference corruption rate that is the number of corrupted storage bits occurring in a megabit of configuration memory cells during one billion hours while shielded from cosmic radiation. When a logic device is shielded from cosmic radiation at a location deep underground, alpha particles from decay of radioactive isotopes within the logic device still cause corruption of the storage bits in the logic device. The table entry at column 220, row 222 similarly provides a reference corruption rate for alpha particles corrupting the storage bits of the block memories of the logic devices of a logic family. When a logic device is not shielded from cosmic radiation, the cosmic radiation and the alpha particles from radioactive decay both cause corruption of storage bits.

In one embodiment, the rate of corruption of the storage bits in a logic circuit is determined from multiplying a quantification of the storage bits in the logic circuit and the reference corruption rate from column 218 or 220.

Columns 224 and 226 provide more reference corruption rates for the product families of column 216. Column 224 provides reference corruption rates that are the number of corrupted storage bits occurring in a megabit of configuration memory cells during one billion hours while exposed to the normalized level of cosmic radiation at New York City. Column 226 similarly provides reference corruption rates for the block memories in each logic family of column 216. The reference corruption rates of columns 224 and 226 generally account for the corruption from alpha particles of columns 218 and 220. However, the reference corruption rates of columns 224 and 226 are not adjusted for the level of solar activity.

Column 228 provides a confidence interval for the reference corruption rates of columns 224 and 226. In one embodiment, upper and lower limits on the rate of corruption of the storage bits are determined from the upper and lower limits on the reference corruption rate as specified by the confidence interval of column 228.

Figure 3:
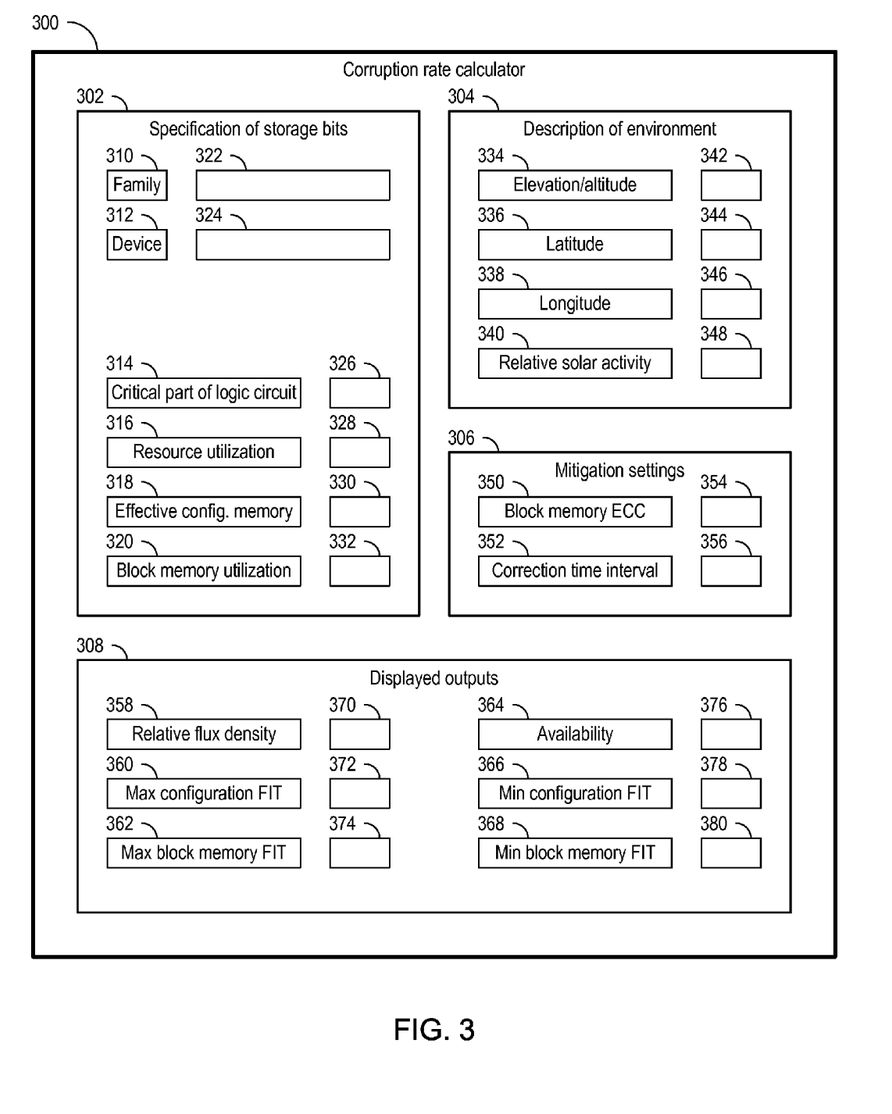
FIG. 3 is a diagram of a display of a calculator that estimates a rate of corruption of storage bits in a logic circuit.

FIG. 3 is a diagram of a display 300 of a calculator that estimates a rate of corruption of storage bits in a logic circuit. The display 300 includes sections 302, 304, and 306 for respectively inputting a specification of the storage bits of the logic circuit, a description of the environment of the logic circuit, and mitigation settings. The display 300 also includes a section 308 for displaying calculated outputs including estimates of the rate of corruption of the storage bits of the logic circuit.

The section 302 for specifying the storage bits includes input labels 310, 312, 314, 316, 318, and 320, and input fields 322, 324, 326, 328, 330, and 332. Input label 310 indicates that input field 322 permits selecting a product family and input label 312 indicates that input field 324 permits selecting a logic device in the selected product family. In one embodiment, input field 322 is a drop-down menu that outputs a list of identifiers of the product families, and the calculator inputs an identifier of a product family that a user selects from the drop-down menu. The calculator then sets the input field 324 to a drop-down menu that outputs a list of identifiers of logic devices in the selected product family, and the calculator inputs an identifier of a logic device that the user selects from the drop-down menu. The calculator consults a database to determine the available storage bits in the selected logic device.

The logic circuit implemented in the selected logic device might not actively utilize all of the available storage bits in the logic device. In one example, the logic device may include storage bits used only during initialization or testing, and corruption of these storage bits might not affect the normal operation of the logic device. In another example, the logic device is a programmable integrated circuit, and the logic circuit may be implemented in a subset of the available resources of the programmable integrated circuit. After designating a critical part of the logic circuit, each configuration memory cell and each block memory is non-critical when any arbitrary value can be assigned to the configuration memory cell or the block memory without functionally affecting the critical part of the logic circuit.

Input label 314 indicates that input field 326 permits specifying the critical part of the logic circuit. In one embodiment, a user specifies a percentage quantifying the critical part of the logic circuit in input field 326. Input label 316 indicates that input field 328 permits specifying the resources used to implement the logic circuit. In one embodiment, the logic circuit is to be implemented in a programmable integrated circuit, and the user specifies a quantity of the programmable logic and interconnect resources of the programmable integrated circuit to be utilized in implementing the logic circuit. Input label 318 indicates that input field 330 permits specifying the configuration memory necessary for implementing the logic circuit. In one embodiment, a user specifies an amount quantifying the configuration memory cells of the programmable integrated circuit needed to configure the programmable logic and interconnect resources to implement the logic circuit. Input label 320 indicates that input field 332 permits specifying the number of block memories to be utilized in implementing the logic circuit. The calculator determines that the number of utilized storage bits as a sum of the storage bits in the utilized block memories of input field 332 and the storage bits in the configuration memory specified by input fields 326, 328, and 330.

The section 304 for describing the environment includes input labels 334, 336, 338, and 340, and input fields 342, 344, 346, and 348. Input label 334 indicates that input field 342 permits specifying the planned altitude of the logic circuit. Input label 336 indicates that input field 344 permits specifying the planned latitude of the logic circuit. Input label 338 indicates that input field 346 permits specifying the planned longitude of the logic circuit. Input label 340 indicates that input field 348 permits specifying the level of solar activity.

The section 306 for mitigation settings includes input labels 350 and 352, and input fields 354 and 356. Input label 350 indicates that input field 354 permits specifying that the logic circuit implements or does not implement an error correcting code for the block memories. If the logic circuit implements an error correcting code for the block memories, corruption of storage bits in each block memory is nearly eliminated because each corruption event usually affects a single storage bit, and the error correcting code can correct corruption of a single storage bit. Input label 352 indicates that input field 356 permits specifying the time interval for the logic circuit to correct corruption of a storage bit. In one embodiment, a checker continuously reads and corrects frames of configuration memory of a programmable integrated circuit using a frame error correcting code, and the calculator inputs from input field 356 the time interval needed to ensure correction of a corrupted storage bit in configuration memory.

Section 308 is provided for displaying calculated outputs and includes output labels 358, 360, 362, 364, 366, and 368, and output fields 370, 372, 374, 376, 378, and 380. Output label 358 indicates that output field 370 displays the flux density of atomic particles calculated from the environment described in section 304. Output label 360 indicates that output field 372 displays the upper limit on the rate of corruption of the utilized storage bits of configuration memory, and output label 366 indicates that output field 378 displays the lower limit on the rate of corruption of the utilized storage bits of configuration memory. Output labels 362 and 368 similarly indicate that output fields 374 and 380 respectively display the upper and lower limits on the rate of corruption of the storage bits of the utilized block memories. Output label 364 indicates that output field 376 displays the estimated availability during which the utilized storage bits of the logic circuit are not corrupted. The calculator determines the estimated availability from the predicted rate of corruption of the utilized storage bits in configuration and block memories and the value of the time interval input from input field 356.

Figure 4:
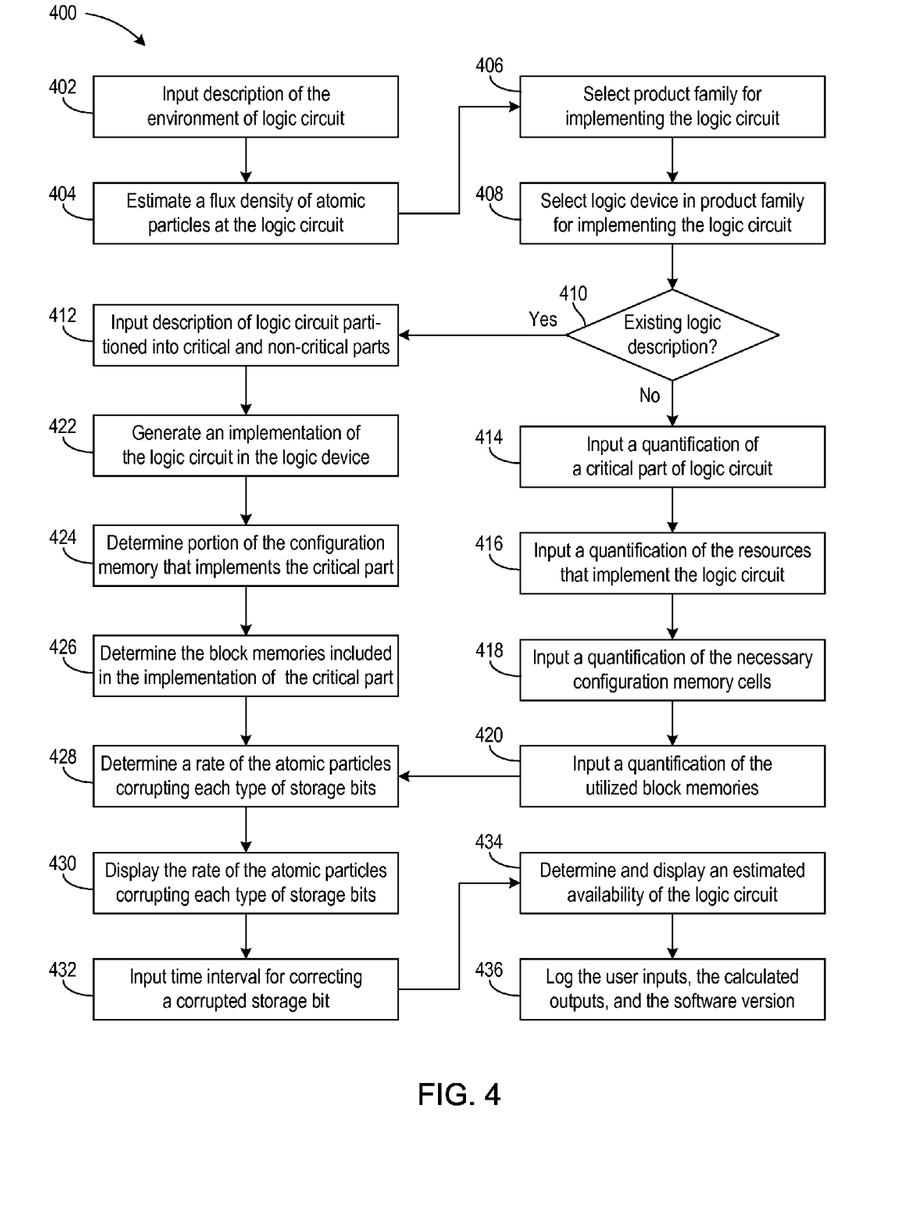
FIG. 4 is flow diagram of a process for estimating a rate of corruption of storage bits in a logic circuit.

FIG. 4 is flow diagram of a process 400 for estimating a rate of corruption of storage bits in a logic circuit. In one embodiment, one or more processors execute instructions that cause the one or more processors to perform the operations of process 400.

At block 402, a description of an environment of the logic circuit is input. At block 404, an atomic particle flux density is estimated at the logic circuit as a function of the environment.

In one embodiment, the flux density is a neutron flux density relative to a reference neutron flux density at New York City, and the relative flux density at the logic circuit is a multiplication of an altitude factor and a geomagnetic factor according to equations given in Annex A of JEDEC Standard No. 89A (JESD89A). The altitude factor is given as a function of the altitude by equations A-5, A-4, and A-3 in Annex A of JESD89A. JESD89A provides two equations for the geomagnetic factor, equation A-6 for low solar activity and equation A-7 for high solar activity. These two equations for the geomagnetic factor are based on a "rigidity cutoff" from Table A.3-C that is a function of the latitude and longitude.

To extend the geomagnetic factor to a range of solar activity in one embodiment, the level of solar activity input from input field 348 of FIG. 3 provides the weights for a linear interpolation between the geomagnetic factors for low and high solar activity.

At block 406, a product family is selected for implementing the logic circuit. At block 408, a logic device, such as a programmable integrated circuit, is selected from the selected product family.

Decision block 410 checks whether there is an existing logic description for the logic circuit. In one embodiment, a functional description of the logic circuit is created in a hardware description language, and an implementation of the logic circuit is generated from this functional description. If the functional description already exists, process 400 proceeds to block 412. However, estimated corruption rates may be needed early in the design phase before the functional description is ready. If the functional description does not yet exist, process 400 proceeds to block 414.

At block 414, an amount is input that quantifies a critical part of the logic circuit. At block 416, an amount is input that quantifies the resources needed to implement the logic circuit. In one embodiment, a report from a preliminary synthesis, placement, and routing of the logic circuit provides the amount of resources needed. At block 418, an amount is input that quantifies the configuration memory cells necessary for implementing the logic circuit. In one embodiment, the preliminary report states the configuration memory bits that are essential for implementing the logic circuit, and the amount of configuration memory cells necessary for implementing the logic circuit is estimated to be one third of these essential bits. At block 420, an amount is input that quantifies the block memories utilized to implement the logic circuit. The logic device selected at block 406 and 408 provides the available storage bits, and the amounts input at blocks 414, 416, 418, and 420 specify the fraction of the available storage bits that is utilized for implementing the logic circuit in the logic device.

When a functional description exists, a more accurate assessment is possible for the utilized storage bits in the logic device. At block 412, a description of the logic circuit in a hardware description language is input. The description partitions the logic circuit into a critical part and a non-critical part.

At block 422, a specification of an implementation of the logic circuit is generated from the description of the logic circuit. The implementation implements the logic circuit in the programmable logic and interconnect resources of the programmable integrated circuit selected at blocks 406 and 408. The programmable integrated circuit includes configuration memory cells that configure the programmable logic and interconnect resources to implement the implementation of the logic circuit. A portion of the configuration memory cells configures the programmable logic and interconnect resources to implement the critical part of the logic circuit, and this portion of the configuration memory cells is determined from the specification of the implementation at block 424. The utilized fraction of the storage bits includes this portion of the configuration memory cells. In addition, a portion of the block memories within the programmable logic and interconnect resources is included in the implementation of the critical part of the logic circuit. At block 426, this portion of the block memories in the critical part is determined from the specification of the implementation, and the utilized fraction of the storage bits further includes this portion of the block memories.

At block 428, a rate is determined for the atomic particles corrupting the utilized storage bits in the configuration and block memories. In one embodiment, the rates for configuration and block memories are separately calculated. The rate of corruption of the utilized storage bits in configuration memory is calculated by multiplying the flux density of the atomic particles, an amount quantifying the utilized portion of the configuration memory cells, and a reference corruption rate for the configuration memory cells of the programmable integrated circuit. The atomic particles are neutrons in this embodiment. The rate of corruption of the utilized storage bits in the block memories is calculated by multiplying the neutron flux density, an amount quantifying the utilized portion of the block memories, and another reference corruption rate for the block memories of the programmable integrated circuit. At block 430, the calculated rate of corruption is displayed. In another embodiment, upper and lower limits on the rate of corruption are determined. The upper limits on the rate is determined by multiplying the neutron flux density, a utilization fraction, a number of the plurality of available storage bits in the logic device selected at blocks 406 and 408, and a lower limit on a reference corruption rate of the product family selected at block 406. The utilization fraction is determined from the inputs at blocks 414, 416, 418, and 420. The upper limit is similarly calculated using an upper limit on the reference corruption rate of the product family.

At block 432, a time interval for correction of a corrupted storage bit is input. At block 434, an estimated availability is determined and displayed. The estimated availability is calculated from the rate of corruption of the utilized storage bits and the time interval input at block 432.

At block 436, the inputs and the process of calculating the outputs are logged. The logging includes the description of the environment of the logic circuit, the atomic particle flux density that is estimated, the specification of the storage bits, the estimated rate of corruption of the storage bits, and a version of the process. In an embodiment having the method implemented on a computer processor, the version is a version of the instructions that cause the computer processor to perform the operations of the method.

Figure 5:
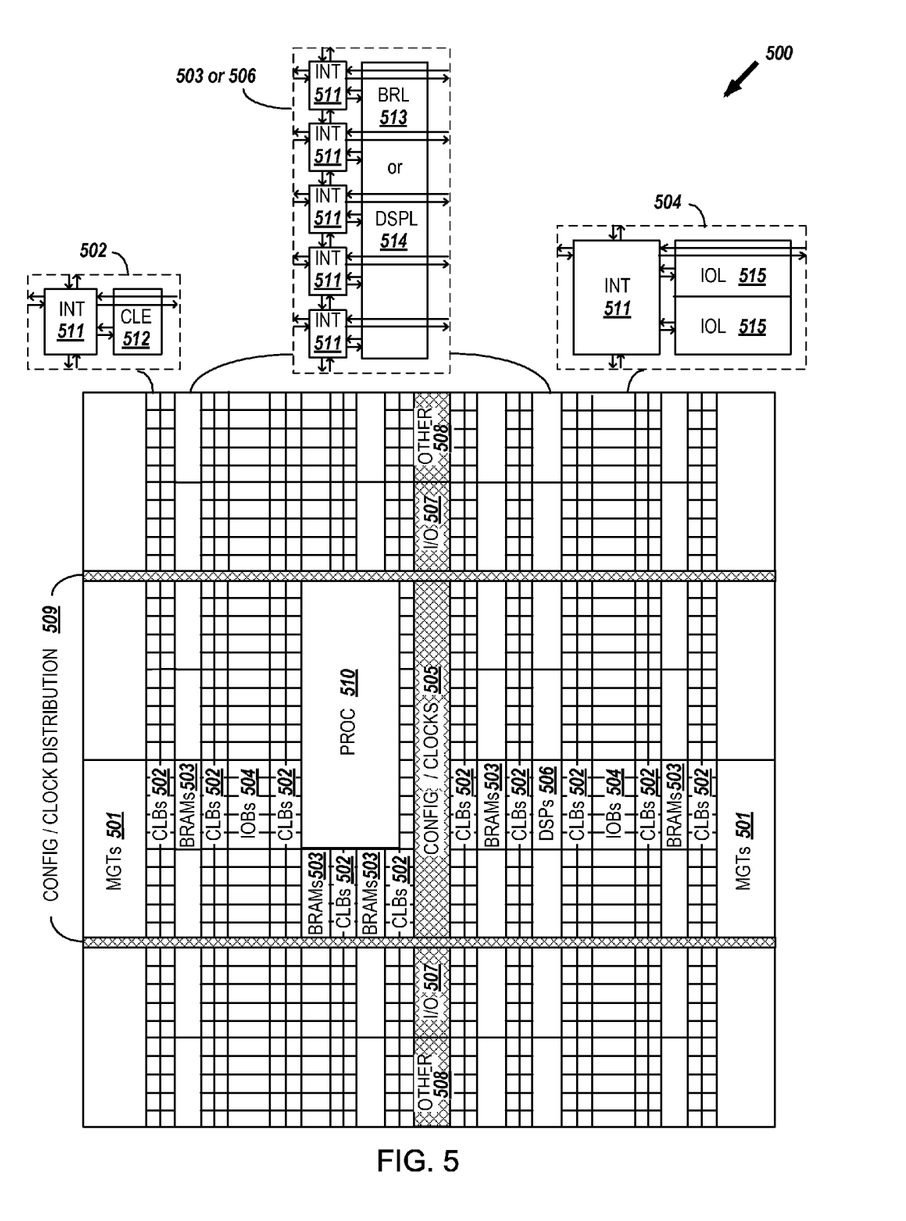
FIG. 5 is a diagram of a programmable integrated circuit including corruptible storage.

FIG. 5 is a diagram of a programmable integrated circuit including corruptible storage. A logic circuit may be implemented on the programmable logic and interconnect resources of programmable integrated circuit. Corruption of certain storage bits in the programmable integrated circuit may alter the functionality of the implemented logic circuit.

FPGAs can include several different types of programmable logic blocks in the array. For example, FIG. 5 illustrates an FPGA circuit (500) that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507), for example, e.g., clock ports, and other programmable logic 508 such as digital clock managers, analog to-digital converters, system monitoring logic, and so forth. Some FPGAs also include dedicated processor blocks (PROC 510) and internal and external reconfiguration ports (not shown).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element INT 511. A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

The embodiments are thought to be applicable to a variety of systems for estimating the rate of storage corruption from atomic particles. Other aspects and embodiments will be apparent to those skilled in the art from consideration of the specification and practice of the invention. The embodiments may be implemented as one or more processors configured to execute software, as an application specific integrated circuit (ASIC), or as a logic on a programmable logic device, or various combinations thereof. It is intended that the specification and illustrated embodiments be considered as examples only, with a true scope and spirit of the invention being indicated by the following claims.

What is claimed is:

1. A method for estimating a rate of corruption of a plurality of storage bits in a logic circuit, comprising:
   on one or more processors, executing instructions for causing the one or more processors to perform operations including:
     inputting a description of an environment of the logic circuit, the description of the environment including a position of the logic circuit;
     estimating an atomic particle flux density at the position of the logic circuit as a function of the description of the environment;
     inputting a specification of the plurality of storage bits in the logic circuit;
     determining the rate of corruption of the plurality of storage bits as a function of the atomic particle flux density and a quantification of the plurality of storage bits in the logic circuit; and
     displaying the rate.

2. The method of claim 1, wherein the inputting of the description of the environment includes inputting an altitude value, a latitude value, and a longitude value that specify the position of the logic circuit.

3. The method of claim 2, wherein the inputting of the description of the environment further includes inputting a level of solar activity.

4. The method of claim 3, wherein the determining of the rate includes multiplying the quantification of the plurality of storage bits in the logic circuit and a reference corruption rate for corruption of the plurality of storage bits of the logic circuit by alpha particles.

5. The method of claim 3, wherein the estimating of the atomic particle flux density includes estimating a neutron flux density at the logic circuit as a function of the altitude value, the latitude value, the longitude value, and the level of solar activity.

6. The method of claim 5, wherein the inputting of the specification of the plurality of storage bits in the logic circuit includes:
   outputting a first list of a plurality of respective identifiers of a plurality of product families;
   inputting the respective identifier of a product family selected from the first list;
   outputting a second list of a plurality of respective identifiers of a plurality of logic devices in the product family; and
   inputting the respective identifier of a logic device selected from the second list, the logic device being selected for implementing the logic circuit.

7. The method of claim 6, wherein:
   the inputting of the specification of the plurality of storage bits in the logic circuit further includes inputting a utilization fraction that indicates a portion of the plurality of available storage bits in which the logic circuit is implemented; and
   the quantification of the plurality of storage bits in the logic circuit equals the utilization fraction of the plurality of available storage bits in the logic device.

8. The method of claim 7, wherein the determining of the rate includes:
   multiplying the neutron flux density, the utilization fraction, a number of the plurality of available storage bits in the logic device, and a lower limit on a reference corruption rate of the product family; and
   multiplying the neutron flux density, the utilization fraction, the number of the plurality of available storage bits in the logic device, and an upper limit on the reference corruption rate of the product family.

9. The method of claim 5, wherein the inputting of the specification of the plurality of storage bits in the logic circuit includes:
   inputting a description of the logic circuit in a hardware description language, the description partitioning the logic circuit into a critical part and a non-critical part;
   generating, from the description of the logic circuit, a specification of an implementation of the logic circuit in a plurality of programmable logic and interconnect resources of a programmable integrated circuit;
   wherein a plurality of configuration memory cells of the programmable integrated circuit are arranged to configure the plurality of programmable logic and interconnect resources to implement the implementation of the logic circuit; and
   determining, from the specification of the implementation of the logic circuit, a portion of the plurality of configuration memory cells that configure the programmable logic and interconnect resources to implement the implementation of the critical part of the logic circuit, the quantification of the plurality of storage bits including the portion of the plurality of configuration memory cells.

10. The method of claim 9, wherein:
    the inputting of the specification of the plurality of storage bits in the logic circuit further includes determining, from the specification of the implementation of the logic circuit, a portion of a plurality of block memories within the plurality of programmable logic and interconnect resources of the programmable integrated circuit;

the implementation of the critical part of the logic circuit includes the portion of the plurality of block memories; and the quantification of the plurality of storage bits includes the portion of the plurality of block memories.

11. The method of claim 10, wherein the determining of the rate includes:
calculating a first rate from multiplying the neutron flux density, a quantification of the portion of the plurality of configuration memory cells, and a first reference corruption rate of the programmable integrated circuit; and
calculating a second rate from multiplying the neutron flux density, a quantification of the portion of the plurality of block memories, and a second reference corruption rate of the programmable integrated circuit.

12. The method of claim 11, wherein:
in response to any arbitrary value being assignable to a configuration memory cell without functionally affecting the implementation of the critical part of the logic circuit, determining the configuration memory cell to be not in the portion of the plurality of configuration memory cells; and
in response to any arbitrary value being assignable to a block memory without functionally affecting the implementation of the critical part of the logic circuit, determining the block memory to be not in the portion of the plurality of block memories.

13. The method of claim 5, wherein:
the inputting of the specification of the plurality of storage bits in the logic circuit includes:
inputting a first quantification of a critical part of the logic circuit;
inputting a second quantification of a first portion of a plurality of programmable logic and interconnect resources of a programmable integrated circuit, the first portion of the plurality of programmable logic and interconnect resources arranged for implementation of the logic circuit in the programmable integrated circuit; and
inputting a third quantification of a second portion of a plurality of configuration memory cells that is arranged for configuration of the first portion of the programmable logic and interconnect resources to implement the logic circuit; and
the determining the quantification of the plurality of storage bits includes determining a number of the plurality of configuration memory cells corresponding to a product of the first, second, and third quantifications.

14. The method of claim 13, wherein:
the inputting of the specification of the plurality of storage bits in the logic circuit further includes inputting a fourth quantification of a third portion of a plurality of block memories within the plurality of programmable logic and interconnect resources of the programmable integrated circuit;
wherein the programmable integrated circuit is arranged for implementation of the logic circuit using the third portion of the plurality of block memories; and
the determining of the quantification of the plurality of storage bits further includes determining a number of the plurality of block memories corresponding to the fourth quantification.

15. The method of claim 14, wherein the inputting of the specification of the plurality of storage bits in the logic circuit further includes:
outputting a first list of a plurality of respective identifiers of a plurality of product families;
inputting the respective identifier of a product family selected from the first list;
outputting a second list of a plurality of respective identifiers of a plurality of programmable integrated circuits in the product family; and
inputting from the second list, the respective identifier of the programmable integrated circuit.

16. The method of claim 15, wherein the determining of the rate includes:
calculating a first rate from multiplying the neutron flux density, the number of the plurality of configuration memory cells, and a first reference corruption rate of the product family; and
calculating a second rate from multiplying the neutron flux density, the number of the plurality of block memories, and a second reference corruption rate of the product family.

17. The method of claim 1, wherein the inputting of the specification of the plurality of storage bits in the logic circuit includes:
inputting a description of the logic circuit in a hardware description language, the description partitioning the logic circuit into a critical part and a non-critical part;
generating, from the description of the logic circuit, a specification of an implementation of the logic circuit in a plurality of programmable logic and interconnect resources of a programmable integrated circuit;
wherein a plurality of configuration memory cells of the programmable integrated circuit are arranged for configuration of the plurality of programmable logic and interconnect resources to implement the implementation of the logic circuit; and
determining, from the specification of the implementation of the logic circuit, a portion of the plurality of configuration memory cells that configure the programmable logic and interconnect resources to implement the implementation of the critical part of the logic circuit, the quantification of the plurality of storage bits including the portion of the plurality of configuration memory cells.

18. The method of claim 1, further comprising:
inputting a value of a time interval between corruption of one of the plurality of storage bits and the logic circuit correcting the one of the plurality of storage bits;
determining an estimated availability of the logic circuit from the rate and the value of the time interval, wherein during the estimated availability the plurality of storage bits are not corrupted; and
displaying the estimated availability.

19. The method of claim 1, further comprising logging the description of the environment of the logic circuit, the atomic particle flux density that is estimated, the specification of the plurality of storage bits, the rate of corruption of the plurality of storage bits, and a version of the instructions.

20. A system for estimating a rate of corruption of a plurality of storage bits in a logic circuit, comprising:
a non-transitory storage medium storing a plurality of instructions that specify a plurality of operations, the plurality of operations including:
inputting a description of an environment of the logic circuit, the description of the environment including a position of the logic circuit;
estimating an atomic particle flux density at the position of the logic circuit as a function of the description of the environment;
inputting a specification of the plurality of storage bits in the logic circuit; and determining the rate of corruption of the plurality of storage bits as a function of the atomic particle flux density and a quantification of the plurality of storage bits in the logic circuit; and one or more processors coupled to the non-transitory storage medium and configured to execute the plurality of instructions from the non-transitory storage medium, wherein execution of the plurality of instructions causes the one or more processors to perform the plurality of operations.

* * * * *